United States Patent [19]
Aoyama et al.

[11] Patent Number: 5,774,973
[45] Date of Patent: Jul. 7, 1998

[54] CONTINUOUS ROLLING METHOD OF CAST BILLETS

[75] Inventors: Soichi Aoyama; Akira Sakai; Koji Okushima, all of Tokyo, Japan

[73] Assignee: NKK Corporation, Tokyo, Japan

[21] Appl. No.: 696,386

[22] Filed: Aug. 14, 1996

[30] Foreign Application Priority Data

Aug. 31, 1995 [JP] Japan ................................ 7-223400
Sep. 22, 1995 [JP] Japan ................................ 7-244083

[51] Int. Cl.$^6$ ........................................... B21B 1/46
[52] U.S. Cl. .......................... 29/526.2; 228/5.7; 228/13
[58] Field of Search ................. 228/5.7, 13; 29/526.2

[56] References Cited

U.S. PATENT DOCUMENTS

| | | | |
|---|---|---|---|
| 2,120,316 | 6/1938 | Stone | 228/5.7 |
| 2,143,969 | 1/1939 | Biggert, Jr. | 228/5.7 X |
| 2,680,938 | 6/1954 | Peterson | |
| 4,721,241 | 1/1988 | Yuasa et al. | |
| 4,850,522 | 7/1989 | Nichols | 228/5.7 X |
| 5,030,313 | 7/1991 | Takeda et al. | 228/5.7 X |

FOREIGN PATENT DOCUMENTS

| | | | |
|---|---|---|---|
| 0053274 A1 | 6/1982 | European Pat. Off. | |
| 2836338 A1 | 2/1980 | Germany | |
| 3901582 A1 | 8/1990 | Germany | |
| 4009861 A1 | 10/1991 | Germany | |
| 52-43754 | 4/1977 | Japan | |
| 57-11722 | 3/1982 | Japan | |
| 59-1085 | 1/1989 | Japan | 228/5.7 |
| 4-157091 | 5/1992 | Japan | |
| 6-63774 | 3/1994 | Japan | |

OTHER PUBLICATIONS

Patent Abstracts of Japan, vol. 7, No. 79 (M–204), Mar. 31, 1983 & JP-A-58 006702 (Nippon Kokan K.K.), Jan. 14, 1983.

Patent Abstracts of Japan, vol. 11, No. 155 (M–589), May 20, 1987 & JP-A-61 286004 Mitsubishi), Dec. 16, 1986.

Patent Abstracts of Japan, vol. 10, No. 122 (M–476), May 7, 1986 & JP-A-60 250811 (Sumitomo), Dec. 11, 1985.

Patent Abstracts of Japan, vol. 18, No. 302 (M–1618), Jun. 9, 1994 & JP-A-06 063774 (Ishikawajima Harima Heavy Ind. Co., Ltd.), Mar. 8, 1994.

Patent Abstracts of Japan, vol. 16, No. 450 (M–1312), Sep. 18, 1992 & JP-A-157091 (Mitsubishi) May 29, 1992.

*Primary Examiner*—Carl J. Arbes
*Attorney, Agent, or Firm*—Frishauf, Holtz, Goodman, Langer & Chick

[57] ABSTRACT

A continuous rolling method includes the steps of: de-scaling billets sent directly from a continuous casting machine; continuously welding the billets using a travelling flash butt welder; grinding a burr on a welded part of the billets to remove the burr using a travelling grinding machine; heating the billets to an elevated temperature using an induction heater; and conducting continuous rolling. The travelling flash butt welder and the travelling grinding machine are separately movable along a running line of the billets, and are moved together during flash butt welding. The flash butt welding is carried out while the flash butt welder and the grinding machine travel a specified stroke for welding. The travelling grinding machine and the travelling flash butt welder are moved together to meet the welded part of each of the billets, and the travelling flash butt welder is returned to a waiting position after the flash butt welding is completed. The burr on the welded part of each of the billets is removed while the travelling grinding machine independently changes travelling direction and travels a specified stroke, after the welded part arrives at a specified position.

2 Claims, 11 Drawing Sheets

AT THE BEGINNING OF WELDING STEP

AT THE COMPLETION OF WELDING STEP

WELDING STROKE:SW

AT THE BEGINNING OF GRINDING STEP

GRINDING STROKE:SG

AT THE COMPLETION OF GRINDING STEP

FIG.3 (a)
AT THE BEGINNING OF WELDING STEP
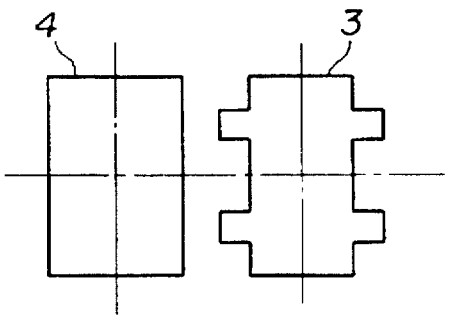
FIG.3 (b)
AT THE COMPLETION OF WELDING STEP
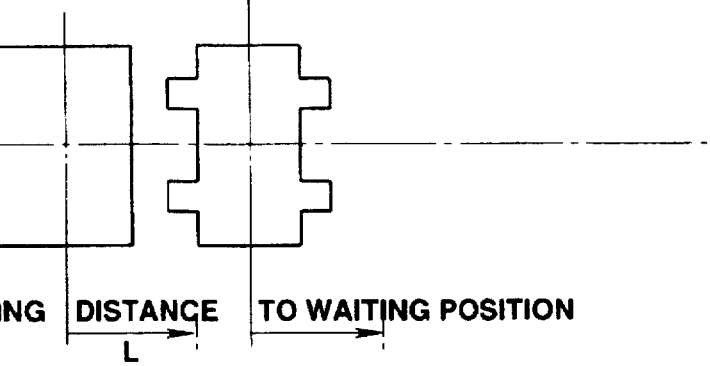
FIG.3 (c)
AT THE BEGINNING OF GRINDING STEP
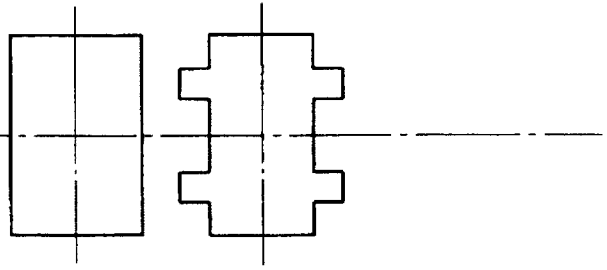
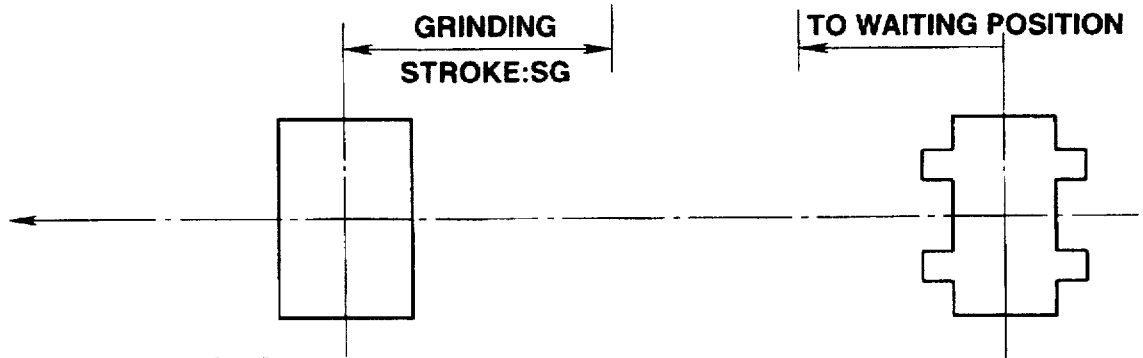
FIG.3 (d)
AT THE COMPLETION OF GRINDING STEP

CONTINUOUS ROLLING METHOD OF CAST BILLETS

BACKGROUND OF THE INVENTION

1. Field of the Invention

The present invention relates to a method and a facility to continuously roll billets directly supplied from a continuous casting machine.

2. Description of the Related Art

The hot direct rolling (HDR) method is known as a rolling method to produce wire rods and steel bars, or to shape steel at high efficiency under an energy saving condition. The HDR method directly charges the continuously cast billets to the rolling mill in an as-cast state, or charges them to the rolling mill line after heating to an adequate temperature through a heating system, in order to conduct continuous rolling. The method, however, rolls the billets successively one by one so that the production yield is poor giving an short length of product. Accordingly, a continuous rolling method in which billets are continuously joined together before rolling has recently been tried to further improve the efficiency. That type of continuous rolling method is disclosed in JP-A-52-43754, for example (the term "JP-A" referred to herein signifies "unexamined Japanese patent publication"). According to the disclosure, a billet which was continuously cast is once cooled, then is heated to an adequate temperature through a heating system. The rear end of the billet coming from the furnace is welded by flash butt welding with the front end of the succeeding billet coming from the furnace using a travelling flash butt welder. Then a scarfer is applied to remove burrs from the welded part. The thus joined continuous bullet is re-heated by an induction heating unit, and is continuously rolled in a rolling mill line.

The conventional continuous rolling method, however, does not directly connect the billet cast line with the billet rolling line.

Consequently, both the billet heating process and the billet re-heating process are essential. As a result, the conventional method has disadvantages of inducing an inverse effect to energy saving and resulting in a large scale production line, and a great cost.

Alternatively, a method to conduct billet heating and re-heating in a single furnace is proposed in JP-B-57-11722, for example (the term "JP-B" referred to herein signifies "examined Japanese patent publication"). The method is similar to the above-described conventional method in that both a billet heating process and billet re-heating process are necessary. In addition, the method requires that the billet be brought out from the furnace in a direction opposite the rolling direction before joining it with another billet, then requires changes in direction for the billet charge to enter the joining process, the welded part burr-removing process, the re-heating process (in the same furnace), and the rolling process. Accordingly, the method results in large heat loss and unavoidably requires a large scale production line.

In general arrangement, the billet casting line crosses the rolling line. When billets are continuously cast in a plurality of strands, they are charged onto the joining line using a chain conveyer or the like. That type of arrangement, however, raises a problem of requiring large floor area for the facilities.

Furthermore, the methods described in JP-A-52-43754 and in JP-B-57-11722 are the ones which forcefully peel off the burr on welded part using a tool such as forming tool, so the wear of the tool becomes severe, and the methods are not suitable for practical application.

For conducting continuous rolling of the billets directly charged from a continuous casting machine, a series of steps are applied, which comprises: the step of scale removal from the billet surface using mechanical or hydraulic pressure de-scaling; continuous joining of the billets travelling at the rolling speed using a flash butt welding method; grinding the billet to remove burrs generated during the flash butt welding in a travelling state of billet; heating the billet by an induction heater; and continuous rolling.

To conduct HDR continuous rolling using current technology, most types of continuous casting machine adopt 2 to 4 strands and 1 to 4 tons of billet weight from the standpoint of balancing the capacity of the continuous casting machine and the capacity for rolling.

On the other hand, recent rolling capacity mostly falls into a range of from 60 to 100 ton/hour. Based on the state, it is desirable that also the HDR continuous casting responds to the rolling capacity range with the above-described billet size. In case small size billets are rolled in a high efficiency rolling line, the cycle time covering from billet-welding to burr-removal should be sufficiently short.

The relation among the billet weight x (ton/billet), the rolling capacity y (ton/hour), and billet treatment cycle time Ts for continuous rolling is expressed by eq.(1).

$$y = (3600/Ts) \cdot x \quad (1)$$

The treatment time per 1 billet in a plant which has a rolling capacity of 60 (ton/hour) for 1 (ton) billet is calculated from eq.(1) as:

$$\begin{aligned} Ts &= 3600 \,(s) \div (60 \,(\text{ton/hour}) \times 1 \,(\text{ton/billet}) \\ &= 60 \,(\text{s/billet}) \end{aligned}$$

This value is the shortest target cycle time.

The time necessary to complete the flash butt welding is sum of the welding time 15 (s) and the clamping and positioning time 25 (s), or total 40 (s). Therefore, the margin is 20 (s). If the grinding time using grinder takes 15 (s), and if the flash butt welder and the grinding machine are integrated, the total consumed time becomes 55 (s), which leaves only 5 (s) as the margin.

Conclusively, the flash butt welder and the grinding machine have to be returned to the waiting position within the left 5 (s) to establish the time cycle. Such a short time is, however, almost impossible for return travelling. As a result, the integrated type of flash butt welder with grinding machine can not realize the 60 sec of cycle time.

SUMMARY OF THE INVENTION

The present invention aims to solve the above-described problems and to actualize a continuous rolling at high efficiency under an energy saving condition while minimizing the extension of the production line. It is an object of the present invention to provide a method and a facility of continuous rolling by combining the above-described direct charge rolling method and the continuous rolling method to enhance the characteristics of both methods.

According to the present invention, a continuous rolling method includes the steps of: de-scaling a billet which is directly sent from a continuous casting machine; continuously welding the billet using a travelling flash butt welder; grinding burr on a welded part of the billet to remove using a travelling grinding machine; heating the billet to an elevated temperature using an induction heater; and conducting continuous rolling; characterized by comprising the steps of: moving together both said travelling flash butt welder and said travelling grinding machine which are movable separately, during flash butt welding; carrying out the flash butt welding while the flash butt welder and the grinding machine run a specified stroke for welding; moving the travelling grinding machine backward together with the travelling flash butt welder to meet the welded part and let the travelling flash butt welder return to a waiting position, after completed the welding; and removing the burr on the welded part, to let the travelling grinding machine separately turn opposite to the travelling direction, and runs a specified stroke, after the welded part arrived at a specified position.

The facility of the present invention comprises: a de-scaling apparatus to remove scale from the billets; a travelling flash butt welder which continuously join the rear end of preceding billet with the front end of succeeding billet by flash butt welding; a travelling burr-removal apparatus which removes burrs on the welded part of billets by grinders; and an induction heater which heats a continuously joined billets.

BRIEF DESCRIPTION OF THE DRAWINGS

FIG. 3(a) shows the position of a separated flash butt welder and grinding machine of the present invention at the beginning of the welding step.

FIG. 3(b) shows the position of the separated flash butt welder and grinding machine of the present invention at the completion of the welding step.

FIG. 3(c) shows the position of the separated flash butt welder and grinding machine of the present invention at the beginning of the grinding step.

FIG. 3(d) shows the position of the separated flash butt welder and grinding machine of the present invention at the completion of the grinding step.

DESCRIPTION OF THE PREFERRED EMBODIMENTS

"Method for continuous rolling"

The layout of the welder and the grinding machine is grouped into the integrated mode and the separated mode as described above. FIG. 2(a) through FIG. 2(d) show the integrated mode where a welder 3 and a grinding machine 4 travel together in integrated mode. FIG. 3(a) through FIG. 3(d) show the separated mode where the welder 3 and the grinding machine 4 travel independently.

(1) For the case of integrated mode

The integrated mode is applied for the case that the billet treatment cycle time is 90 sec. or more. The movement of the integrated machines is described in the following. At the beginning of the welding step, both the welder 3 and the grinding machine 4 are at their waiting position (refer to FIG. 2(a)). The flash butt welding of a billet is performed while the welder 3 and the grinding machine 4 travel together through the passage of the predetermined welding stroke SW (refer to FIG. 2(b)). The travelling time over the stroke SW takes 40 sec. as described before. The burr removal step begins at the position that the welding step completes and on arrival of the welding part (refer to FIG. 2(c)). The grinding completes during the period that both the welder 3 and the grinding machine 4 travel together through the grinding stroke SG (refer to FIG. 2(d)). The time until the welding part arrives (the waiting time) is 10 sec., and the travelling time of the grinding machine 4 is 15 sec. Accordingly, the flash butt welding and the grinding of burrs are completed during 65 sec. so that the remained time becomes (90–65=25 sec.) Both the welder 3 and the grinding machine 4 have to be returned to their waiting position within 25 sec. The timing of 25 sec. is sufficient for completing the time cycle.

(2) For the case of separated mode

The separated mode is applied when the billet treatment cycle time is 90 sec. or less. When the welder 3 and the grinding machine 4 are separated from each other, the welder 3 can be separately returned to its waiting position after completed the welding step, as shown in FIG. 3. Accordingly, even if the target cycle time is 60 sec., the residual time of 20 sec. is fully used for the transfer of the welder 3. In addition, after the welding step is completed, the grinding machine 4 also once travels backward along with the welder 3, (backward travelling distance L), to go to meet the welded part up to the position for starting the grinding action (refer to FIG. 3(c)). If, after completing the welding step, the grinding machine 4 waits until the welded part arrives at the position for starting the grinding action, the cycle time is consumed ineffectively. So the grinding machine 4 goes to meet the welded part to prevent useless consumption of cycle time. The backward travelling time is about 5 sec. Consequently, the remaining time at the completion of grinding becomes 60−(15+5)=40 sec., which allows the grinding machine 4 to return to its waiting position with a sufficient margin of time.

Figure 1:
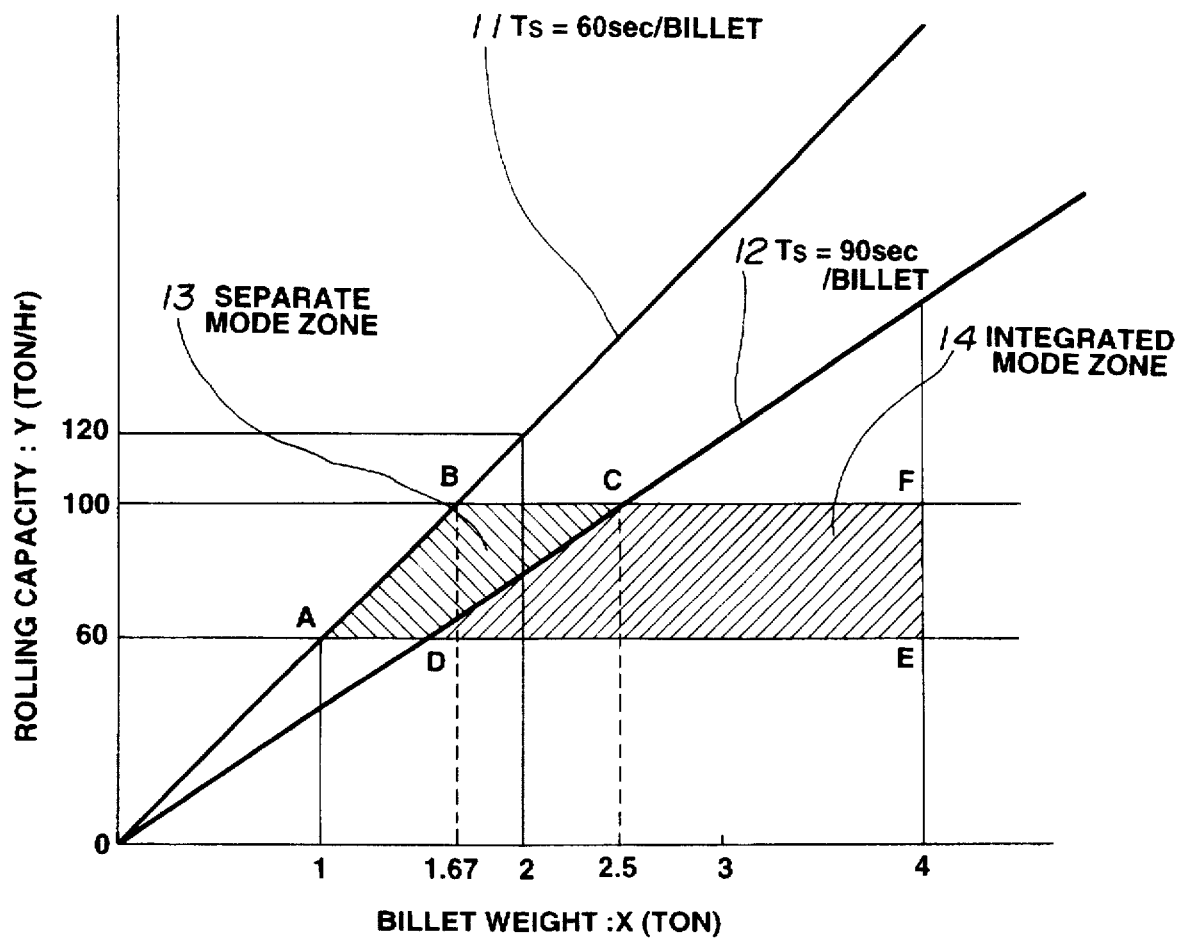
FIG. 1 is a graph showing the relation of billet weight, rolling capacity, and billet treatment time of the present invention.
Figure 2:
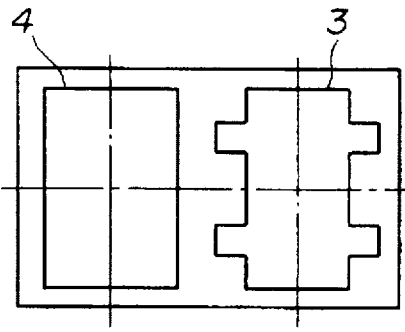
FIG. 2(a) shows the position of an integrated flash butt welder and grinding machine of the present invention at the beginning of the welding step.
FIG. 2(b) shows the position of the integrated flash butt welder and grinding machine of the present invention at the completion of the welding step.
FIG. 2(c) shows the position of the integrated flash butt welder and grinding machine of the present invention at the beginning of the grinding step.
FIG. 2(d) shows the position of the integrated flash butt welder and grinding machine of the present invention at the completion of the grinding step.
Figure 2:
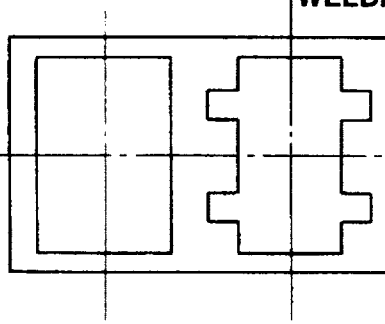
Figure 2:
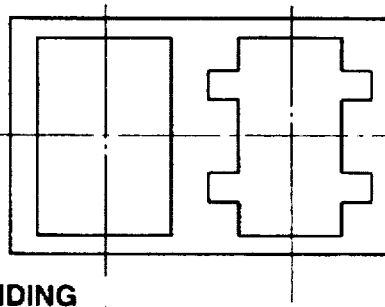
Figure 2:
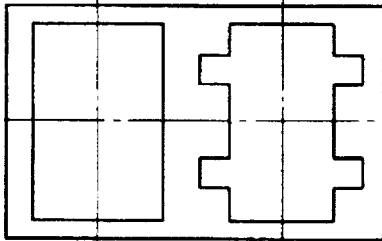

As described above, for the case of 100 ton/hour rolling facility, the separated mode gives 60 sec. or longer cycle time if only the billet weight is 1.67 ton (100÷(3600×60= 1.67 ton/billet)) or more, as shown in FIG. 1, and the above-described method is applicable. For the case of integrated mode, however, the mode is only applicable for the billet weight of 2.5 ton or more. Therefore, the integrated mode is applicable only for the billet having 2.5 tons or more of weight.

The present invention is described in more detail referring to the following embodiments.

EXAMPLE 1

| Rolling capacity: | 90 ton/hour |
|---|---|
| Weight and size of billet: | 2 ton, |
| | 154 × 154 (square) × 10.8 m |
| Feed cycle: | 80 sec. |
| Feed speed: | 10.8/80 = 0.135 m/sec |
| Continuous casting machine (CCM): | 3 strands, |
| | 0.135/3 × 60 = 2.7 m/min. |
| Rolling mill line: | |
| Rough train | 4 stands |
| Intermediate train | 8 stands |
| Finish train | 4 stands |
| Total | 16 stands |
| Product: | Reinforcing bar D13–D38 |

EXAMPLE 2

| Rolling capacity: | Max. 100 ton/hour |
|---|---|
| Weight and size of billet: | 3 ton, 210 (round) × 11.1 m |
| Feed cycle: | 108 sec. |
| Feed speed: | 11.1/108 = 0.103 m/sec |
| Continuous casting machine (CCM): | 2 strands, |
| | 0.103/2 × 60 = 3.1 m/min. |
| Rolling mill line: | |
| Rough train | 6 stands |
| Intermediate train | 6 stands |
| Finish train | 6 stands |
| Total | 18 stands |
| Product: | Reinforcing bar D18–D41 |
| | 5.5–16 mm dia. |

(Example 1)

Figure 4:
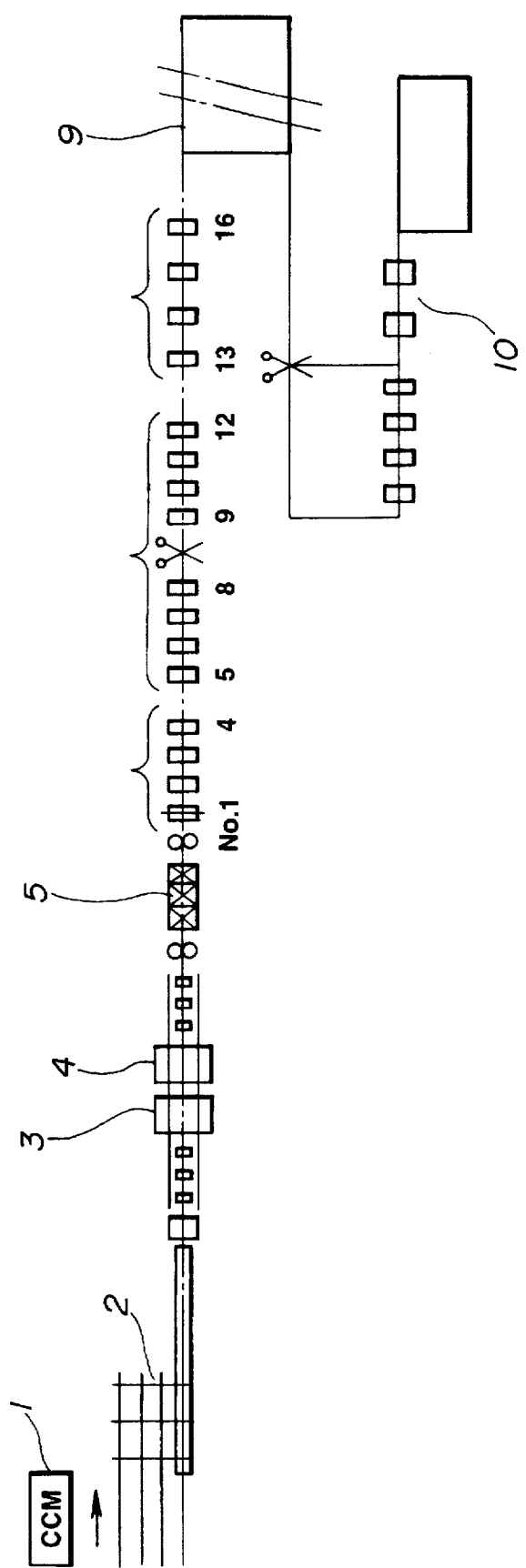
FIG. 4 illustrates an example of a facility to perform the method of the present invention.

A facility arrangement shown in FIG. 4 was applied to roll for manufacturing reinforcing bars. The reference numeral 1 is CCM, 2 is a table which feeds billets succeedingly, 3 is the welder, 4 is the grinding machine for burr removal, 5 is an induction heater, 6 is roughing train of 4, 7 is intermediate train, 8 is finishing train, 9 is a cooling bed, 10 is a facility for cutting and bundling.

Example 1 is an example of separated mode (the welder 3 and the grinding machine 4 are separately travels each other) to shorten the cycle time of billet treatment.

CCM 1 has 3 strands, and the handling billet has a size of 154×154 mm and of 10.8 m of length, and a weight of 2.0 tons. The flash butt welder 3 is directly connected to the CCM at downstream thereof. The billets which were cut in each strand are fed successively in the order of arrival to the welder 3 by the table 2 located in front of the welder 3. The average temperature of the billets was about 914° C.

The welder 3 has about 7 m of travelling stroke, and it carried out the welding of billets while travelling synchronously with the billet of about 7 m length at a 0.135 m/sec of speed entering to the No. 1 stand under a condition of 90 ton/hour of rolling capacity.

The average cycle time of the welder at that time was:

| Billet arrival - Clamping | 12 sec |
|---|---|
| Clamping - Welding completion | 31 sec |
| Welding completion - Unclamping | 6 sec |
| Total | 49 sec |
| Return travel of welder (at 0.35 m/sec) | 26 sec |
| Grand total | 75 sec |

Therefore, the total average cycle time became 75 sec. After completing the welding step, the burr removal on the welded part was carried out using the travelling grinding machine 4 which traveled separately from the welder 3 and which was located downstream of the welder 3. For the burr removal, two sets of grinders facing each other were used, and the time for burr removal was 21 sec. counting from the start of travelling from the waiting position. In the continuous rolling with separated mode, the rate-controlling time cycle was 75 sec. for the welder, and the average travelling stroke of the welder was 6.2 m.

Since the billet-feeding cycle time at 90 ton/hour of rolling capacity was 80 sec., the welder had about 5 sec. for waiting (margin time) at the upstream waiting position, which allowed smooth rolling operation.

The average billet temperature was 908° C. at the inlet of the induction heater 5, and the induction heater 5 controlled to maintain the billet temperature to an average 990° C.

The rolling line comprises 4 stands of roughing train 6, 8 stands of intermediate train 7, and 4 stands of finish train 8, accounting for total 16 stands. The maximum speed was 12.9 m/sec for the minimum size D13 rolling (slit rolling).

The rolled billets are cut to divide for sending to the cooling bed 10. After cooled, they are transformed to the cutting and bundling apparatus 10 to become the product. All the products manufactured by the method specified properties of product.

(Example 2)

Figure 5:
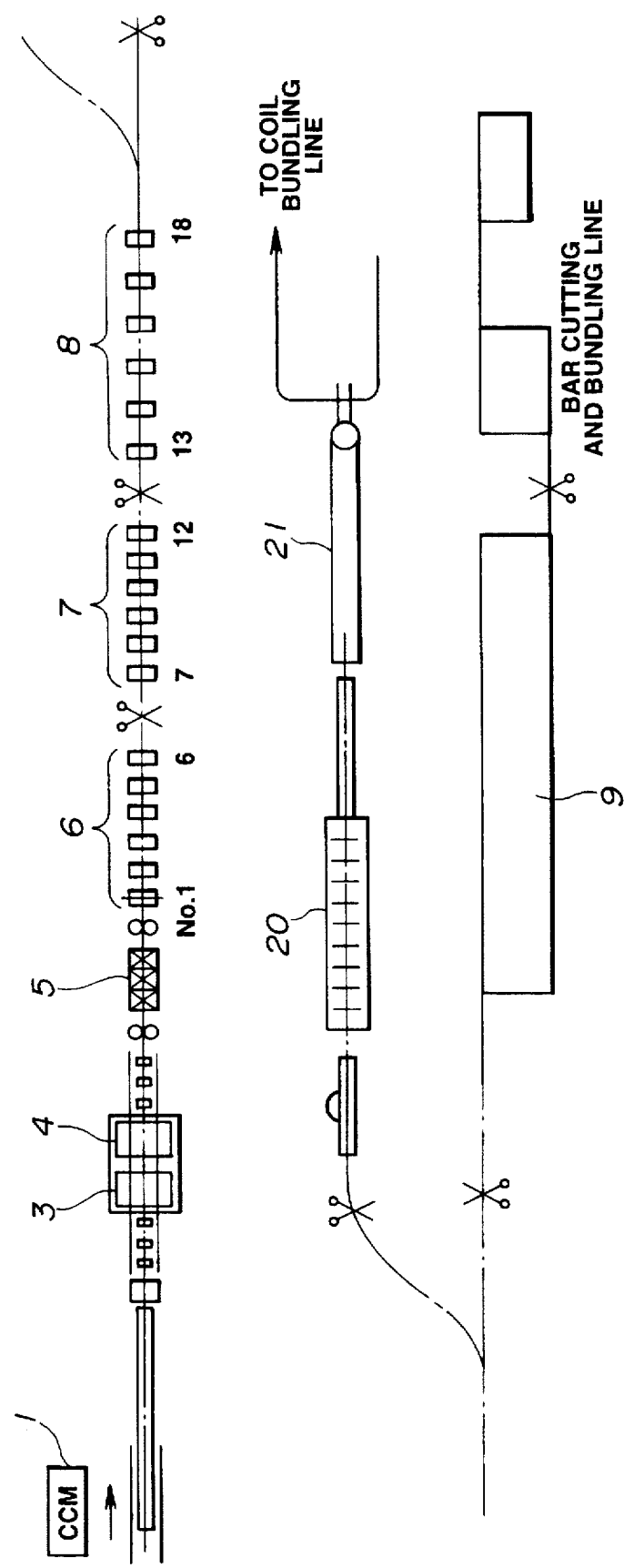
FIG. 5 illustrates another example of a facility to perform the method of the present invention.

A facility arrangement shown in FIG. 5 was applied to roll for manufacturing reinforcing bars and wires. Since the example used large billets and had a margin of cycle time, the welder 3 and the grinding machine 4 were integrated together.

CCM 1 uses 2 strands, and the billet size was 210 mm dia.×11.1 m long, with the weight of 3.0 tons.

Downstream of CCM 1, a direct connection line of the grinding machine 4 integrated with the welder 3, and the induction heater 5 were arranged as shown in FIG. 5. Furthermore, as the rolling facility for HDR, tandem rolling lines were arranged which included 18 stands of bar-rolling line and 10 stands of block-mill 20 for wire rolling.

Billets directly fed from CCM 1 was sent to the welder 3 which was integrated with the grinding machine 4 via the table 2 located in front of the welder 3. The billet temperature at this point was about 990° C. The welder 3 traveled together with the burr-removing grinding machine 4, and the maximum stroke was 8 m.

When the rolling line was operated at its maximum capacity of 100 t/h, the cycle time of billet feed was 108 sec., and the entering speed of the billet to the No. 1 stand was 0.103 m/sec.

The welder traveled synchronously with the billet entering speed to conduct the clamping of succeeding billet, welding the billet, and burr-removal.

The cycle time of the operation was:

| Billet arrival - Clamping | 14 sec |
| --- | --- |
| Clamping - Welding completion | 33 sec |
| Welding completion - Unclamping | 6 sec |
| Unclamping - Grinding start | 7 sec |
| Grinding start - Grinding completion | 12 sec |
| Total | 72 sec |
| Return run of welder | 30 sec |
| Grand total | 102 sec |

Therefore, the total average cycle time became 102 sec., and even at the maximum rolling at 100 t/h capacity, there was a margin of (108–102=6 sec.), which assured a stable continuous rolling. The average travelling distance of the welder at that time was 7.4 m.

The average billet temperature at the inlet of induction heater 5 after welding was 928° C. The induction heater 5 heated the billets to an average temperature of from 990° to 1010° C. for rolling.

The rolling line comprises: the bar-line consisting of 6 stands in roughing train, 6 stands in intermediate train, and 6 stands in finishing train; and downstream rolling facility for wire rolling consisting of the block mill 20 containing 10 stands. The bar-line carried out the slit rolling of 2 strands at 8.9 m/sec for D16, and one strand rolling at 12.4 m/sec for D19. The rolling of both cases provided stable products with uniform properties which satisfied the mechanical property of product.

For the wire rolling, the product of continuous rolling was cut by the tab-shear 21 to produce 2 ton coils. The products showed uniform and satisfactory properties.

As described above, the method of the present invention adopts the separate mode in which the welder and the grinding machine travel separately each other, and lets the grinding machine travel to inverse direction at the completion of the welding step. As a result, the time cycle is established even for the target of billet weight of 1 to 2.5 ton and of rolling capacity of 60 to 100 tons, and the continuous rolling compatible with actual plant capacity is available. For the case of integral mode of welder and grinding machine, it is applicable only when the billet weight is in the domain of integral mode zone in FIG. 1 against the rolling capacity.

"Continuous rolling facility"

Figure 6:
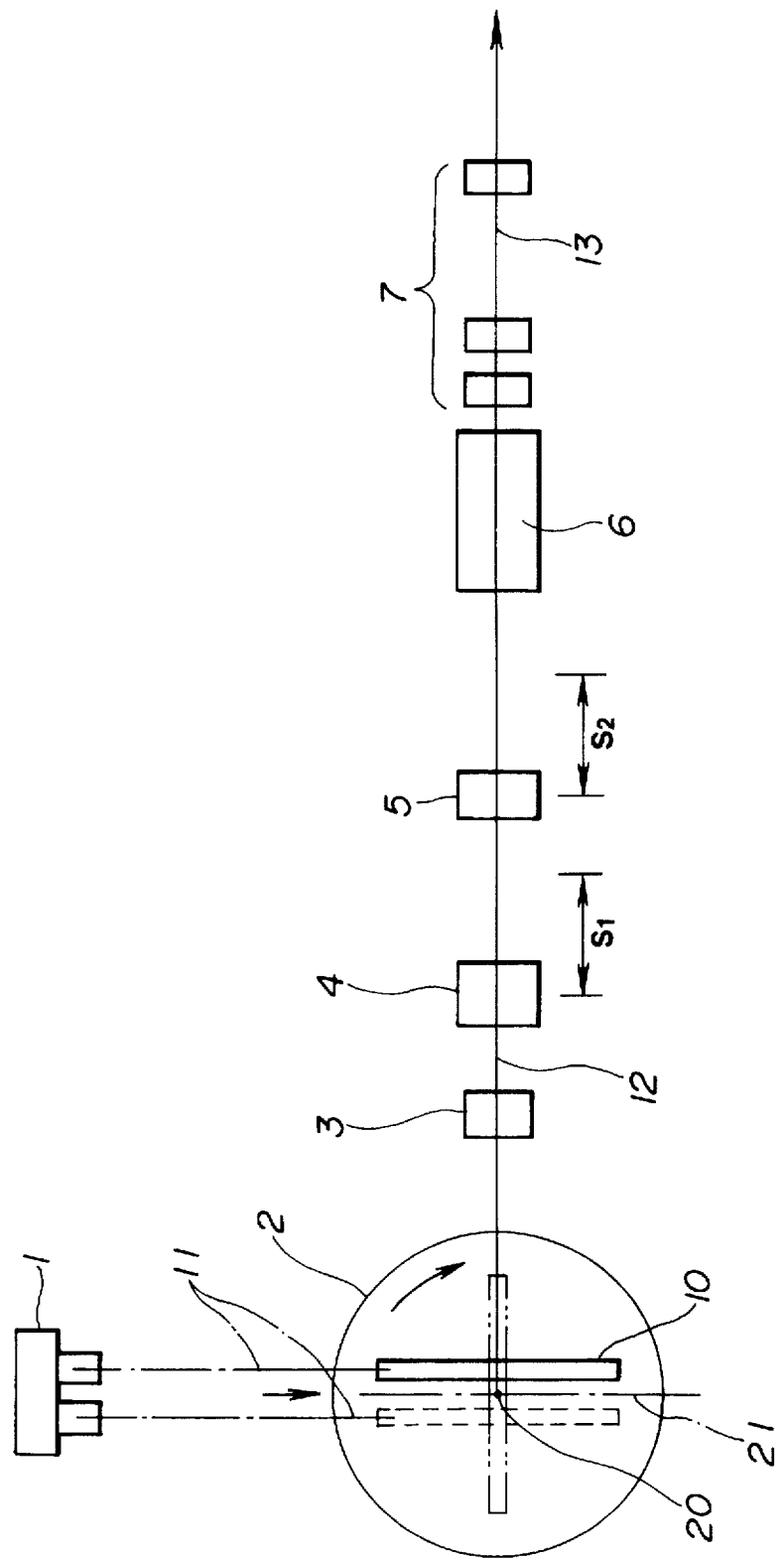
FIG. 6 shows a schematic drawing of a continuous rolling facility of the present invention.

FIG. 6 shows a schematic drawing of an example constitution of an HDR continuous rolling facility of the present invention. The figure illustrates a flat arrangement of each apparatuss.

The reference number 1 is the continuous casting machine showing, as an example, two strand continuous casting machine. The reference number 2 is the turn table located at the end of the billet joining line 12, and the center of rotation 20 matches the joining line 12. The casting line 11 and the joining line 12 cross orthogonally each other in this example, though the angle of crossing is arbitrarily selected. A plurality of casting lines 11 are positioned symmetrically to the center of rotation 20 of the turn table 2, and has the function to shift the billet 10 which was transferred onto the turn table 2 during the rotation thereof and to align the billet 10 with the joining line 12. Although the shifting mechanism is not shown, a means to slide a row of support rolls mounted on the turn table 2 may be applied. The billet joining line 12 is connected linearly to the upstream side of the rolling line 13. The joining line 12 is provided with the turn table 2, the de-scaling apparatus 3, the travelling flash butt welder 4, the travelling burr-removal apparatus 5, and the induction heater 6, in the order of billet feeding. The reference number 7 is a rolling line consisting of plurality of rolling mill stands which structure the rolling line 13.

The de-scaling apparatus 3 conducts scale removal on the billet 10 using, for example, injection of high pressure water or a rotary brush. The scale removal operation improves the electric current conduction during the billet welding step and prevents damage on the electrode face. The area to remove scale on the billet 10 does not necessarily cover the whole length of the billet but the area may be limited to front end and rear end of the billet 10 where the flash butt welding electrode touches.

Figure 7:
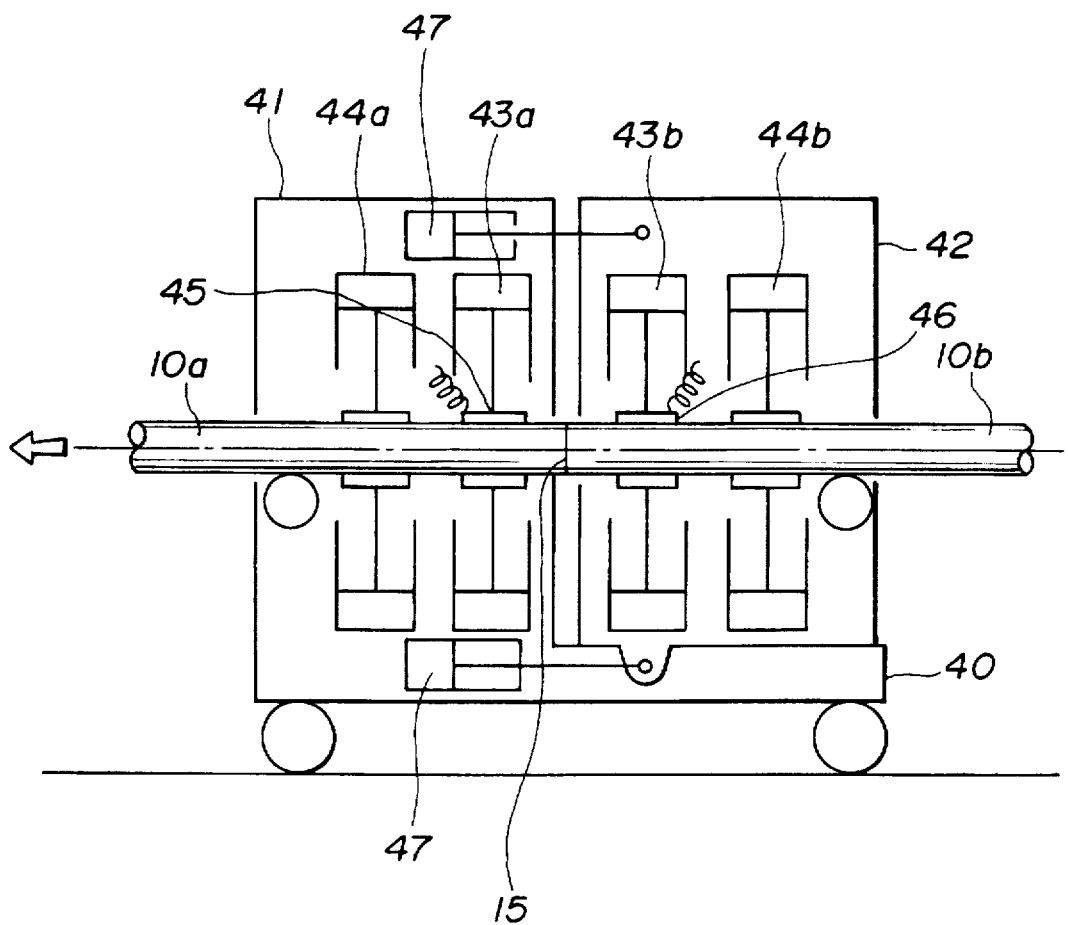
FIG. 7 shows a sectional-side view of a travelling flash butt welder of the present invention.
Figure 8:
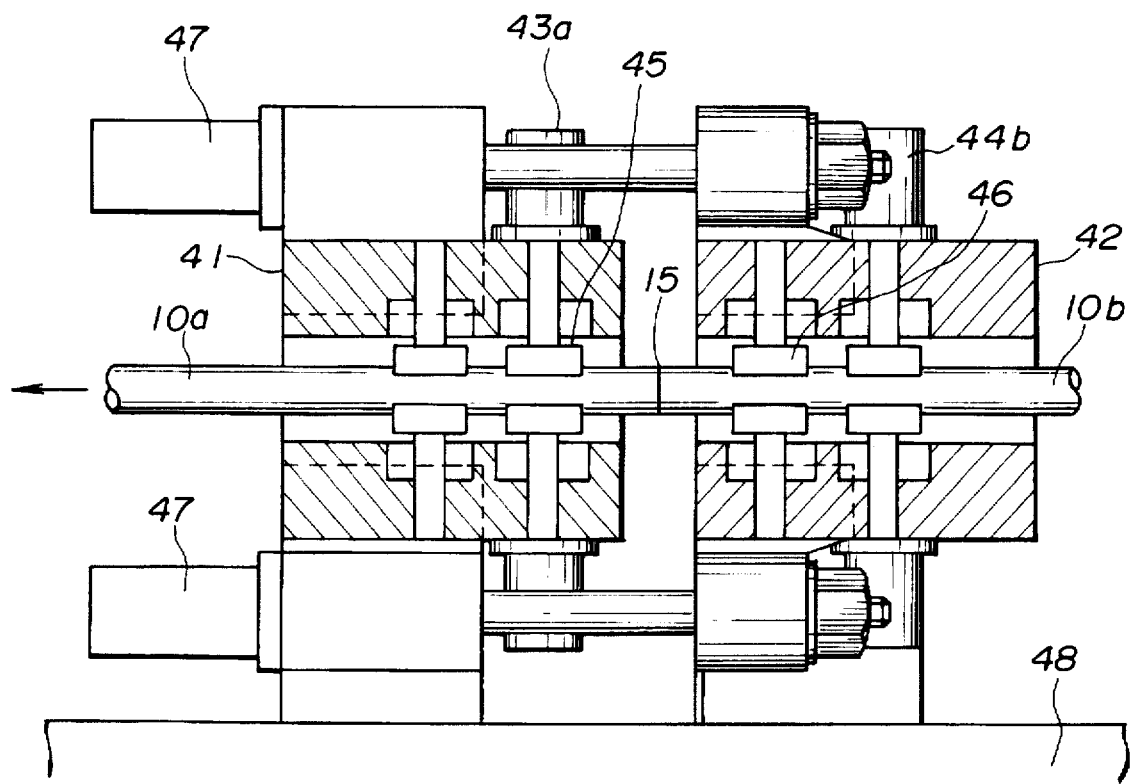
FIG. 8 shows a side view partly in section of the clamp section of the travelling flash butt welder of the present invention.
Figure 9:
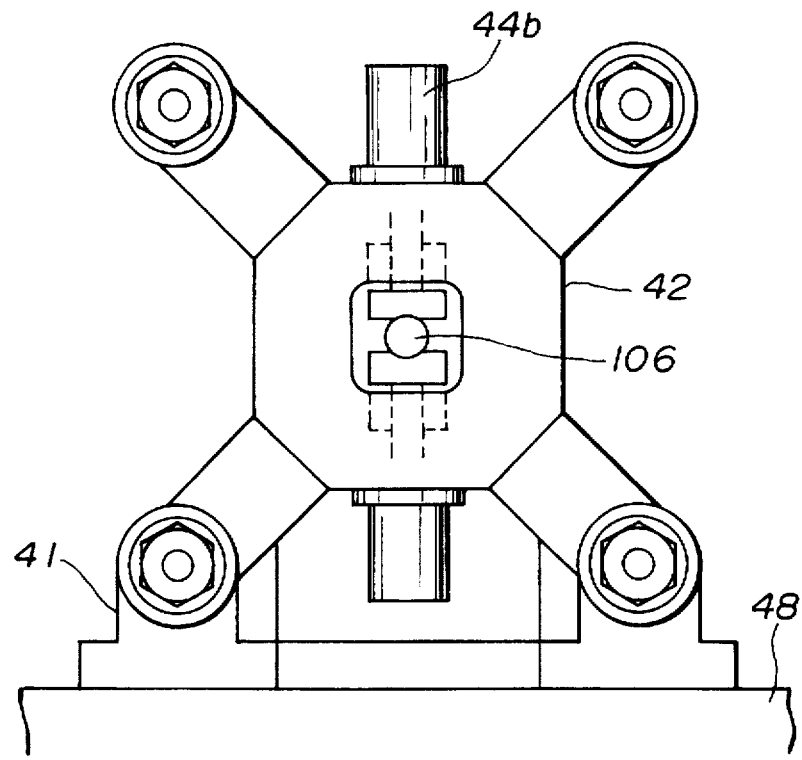
FIG. 9 shows the front view of the clamp section of the travelling flash butt welder of the present invention.

FIG. 7 shows a schematic drawing of a travelling flash butt welder. FIG. 8 shows a side view partly in section of the clamp section of the welder. FIG. 9 shows the front view of the clamp section.

The welder 4 is provided with the stationary head 41 and the moving head 42 in the travelling body 40. Each of the heads has plurality of hydraulic cylinders 43a, 44a, and 43b, 44b, to clamp the preceding billet 10a and the succeeding billet 10b, respectively. The clamp body of the hydraulic cylinder 43a and of the hydraulic cylinder 43b, both of which are located near to the ends of billets, act as the electrodes 45 and 46, respectively. The stationary head 41 and the moving head 42 are joined together by plurality of upset hydraulic cylinders 47. The hydraulic cylinders 43a, 43b for driving electrode are positioned as near to the edges of billet as possible. The reference number 48 is the base to which the stationary head 41 is mounted.

Figure 10A:
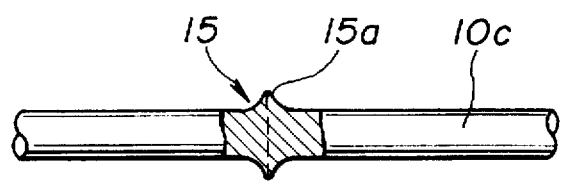
FIG. 10(a) is a sectional view showing the state before removing a burr from the billet welded part using the facility of the present invention.
Figure 10B:
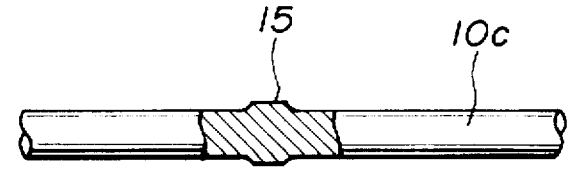
FIG. 10(b) is a sectional view showing the state after removing the burr from the billet welded part using the facility of the present invention.

FIG. 10(a) is a schematic sectional view of the welded part 15 formed by flash butt welding of the rear end of the preceding billet 10a with the front end of the succeeding billet 10b using the above-described welder 4. The upset of flash butt welding raises the welded part 15 from the external periphery, so the burr 15a is removed by the travelling burr-removal apparatus 5 described below. FIG. 10(b) is the state after removing the burr 15a from the welded part.

Figure 11:
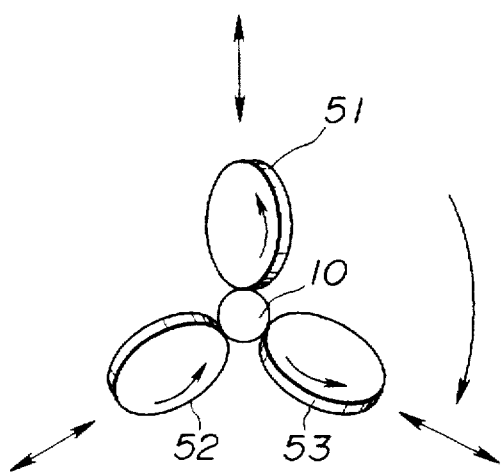
FIG. 11 shows the front view of a travelling burr-removal apparatus for a round billet in the facility of the present invention.
Figure 12A:
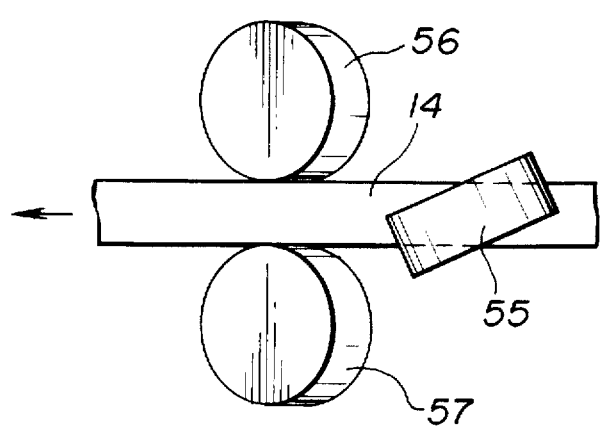
FIG. 12(a) is a side view of a travelling burr-removal apparatus for a square billet in the facility of the present invention.
Figure 12B:
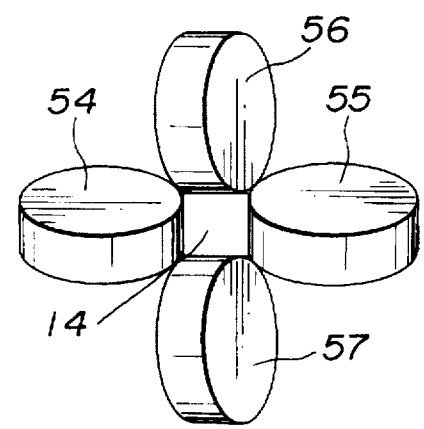
FIG. 12(b) is the front view of a travelling burr-removal apparatus for the square billet in the facility of the present invention.

FIG. 11 shows the front view of a travelling burr-removal apparatus for round billet. FIG. 12(a) shows a side view of the travelling burr-removal apparatus for square billet. FIG. 12(b) is the front view of the apparatus.

The travelling burr-removal apparatus 5 shown in FIG. 11 comprises a plurality of grinders 51 through 53 which are separately rotating on a travelling body (not shown) and which are arranged along the outer periphery of the billet 10 at a uniform spacing under a condition that each of the grinders 51 through 53 are arranged to have an inclined angle against the center axis of billet 10 and that each of the grinders 51 through 53 rotates around the billet 10. In addition, each of the grinders 51 through 53 is movable in the radial direction of the billet 10. By arranging each of the grinders 51 through 53 at an inclined angle against the center axis of billet 10, a relatively thin grinder can remove a wide range of burrs 15a from the welded part 15.

For the case of round billet 10, by rotating a plurality of grinders 51 through 53 around the round billet 10, the burr 15a can be removed as shown in FIG. 10(b).

For the case of square billet 14, the grinders 54 through 57 are arranged around the square billet 14 as shown in FIG. 12(a) and FIG. 12(b), and each of the grinders are arranged at a tilted position while displacing the pair of right and left grinders, 54, 55, from the pair of top and bottom grinders, 56, 57, along the charge direction of the square billet 14, thus avoiding mechanical interference between these pairs. Accordingly, the burr is removed by two-step operation in that case.

Since the induction heater 6 and the rolling mill line 7 are known equipment, detailed illustration is not given.

The action of the above-described HDR continuous rolling facility is described below.

The billets 10 which were continuously cast by the continuous casting machine 1 are transferred onto the turn table 2 successively, then each of the billets 10 is shifted its direction to align the center line 21 to match the joining line 12. After the alignment, the billets 10 are directly supplied successively to the joining line 12. The directly supplied billets 10 travel while keeping nearly equal interval. First, on the de-scaling apparatus 3, the scale mainly on the edges, front end, and rear end of the billet is removed by hydraulic or mechanical means. Next, the preceding billet 10a and the succeeding billet 10b are separately clamped by the hydraulic cylinders 43a, 44a, and 43b, 44b, respectively, while the travelling flash butt welder 4 travels at nearly equal speed with that of the billets 10. Thus the upset hydraulic cylinder 47 brings the succeeding billet 10b close to the preceding billet 10a to contact each other. A large current is applied to both ends of the billets through the electrodes 45, 46, to generate flashes repeating short circuits and archings and to bring both ends to fused state. The upset hydraulic cylinder 47 applies upset to the succeeding billet 10b to join with the preceding billet 10a. The flash butt welder 4 conducts the flash butt welding during the period of travelling through the stroke S1 given in FIG. 6 at a nearly equal speed with that of the billet transfer. When the welding is completed, the flash butt welder 4 returns to the original position. The welder 4 repeats the flash butt welding to join thus obtained continuous billet 10c with further succeeding billet 10b. In this manner, the billets 10 are successively joined together by the flash butt welding.

The burr 15a on each welding part 15 is continuously removed by the travelling burr-removal apparatus 5. That is, when the apparatus 5 detects the welded part 15 on the continuous billet 10c, it moves the grinders 51 through 53 which are kept to rotate at a constant speed toward the center of the billet using an adequate hydraulic cylinder or the like while the apparatus is travelling downstream. Then the apparatus 5 presets to the billet 10c. The billet 10c is further transferred to downstream. When the welded part 15 of the billet 10c reaches the lower face of the grinders 51 through 53, the driving current of the drive motor suddenly increases, and of the welded part 15 is detected by the sudden change in current. When the welded part 15 reaches the lower face of the grinders 51 through 53, the rotating grinders 51 through 53 are fixed to the preset position, and further they are rotated around the billet 10c, thus the burr 15a on the whole periphery of the billet 10c is ground. Also the burr-removal apparatus 5 conducts burr-removal during a period of travelling through the predetermined stroke S2 shown in FIG. 6. After completing the burr-removing cycle, the apparatus 5 returns to the original position, and repeats the burr-removing operation to the following welding part 15. Thus the burrs on the welded part 15 are continuously removed.

In the case that square billets 14 are treated, the grinders 54 through 57 are arranged as shown in FIG. 12(a) and FIG. 12(b). By approaching the billet beginning from the upstream grinders 54, 55 while rotating the grinders 54 through 57, the burr on right and left sides, then the burr on top and bottom sides are removed in two step grinding.

As described above, the continuous billet 10c is subjected to the burr-removing action on each welded part 15 in the travelling burr-removal apparatus 5 and transferred into the induction heater 6 where the billet 10c is heated to a temperature of from 990° to 1010° C., and further the heated continuous billet 10c is treated by continuous rolling in the rolling mill line 7.

Accordingly, the continuously cast billets 10 are directly supplied successively to pass through the de-scaling step, the travelling flash butt welding step, the travelling burr-removing step, the heating step, and the continuous rolling step. Thus the billet heating step is only a single stage, which significantly contributes to energy saving and which enables high efficiency continuous rolling without increasing the scale of the production line. Since the flash butt welding is performed while the directly supplied billet holds the high temperature at around 800° to 900° C., the necessary pre-heating time for the flash butt welding is shortened, which then shortens the welding time and shortens the cycle time. The flash butt welding induces no problem of material strength. Furthermore, since the burr-removal at the welded part 15 is carried out by grinders, the burr-removing time becomes short. The grinding with grind stone grinders has a feature that the grinding performance sustains for a long time even under an abraded state of the grinders.

Figure 13:
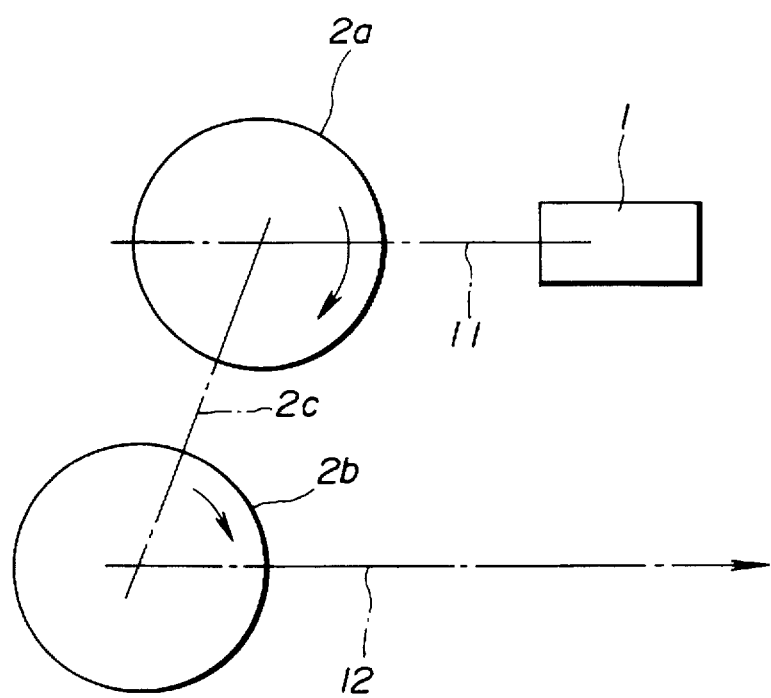
FIG. 13 is a schematic drawing illustrating another arrangement of turn tables in the facility of the present invention.

Since the method relays the casting line 11 and the joining line 12 by the turn table 2, both lines can be connected at an arbitrary crossing angle, which gives a wide freedom of production line arrangement. When the casting line 11 and the joining line 12 are arranged in parallel each other, two turn tables 2a, 2b may be applied as illustrated in FIG. 13. The reference number 2c is a relay line consisting of a series of transfer rolls.

As described above, the present invention adopts a series of continuous rolling steps for the directly supplied billets which were continuously cast, high efficiency continuous rolling under an energy saving condition is achieved without increasing the length of production line. In addition, the billet welding time and the burr-removing time at the welded part are shortened, so the cycle time is shortened. Furthermore, the casting line and the joining line are relayed using a turn table, so the freedom of production line arrangement increases, the application to the existing facilities is readily conducted, and a buffer function to time cycle is available. Conclusively, the facility and method of the present invention provide significant effect as a practical application.

What is claimed is:

1. A continuous rolling method comprising the steps of:
    de-scaling billets sent directly from a continuous casting machine;
    continuously welding the billets using a travelling flash butt welder;
    grinding a burr on a welded part of the billets to remove the burr using a travelling grinding machine;
    heating the billets to an elevated temperature using an induction heater; and
    conducting continuous rolling;
    wherein said travelling flash butt welder and said travelling grinding machine are separately movable along a running line of the billets, and are moved together during flash butt welding;

wherein said flash butt welding is carried out while said flash butt welder and said grinding machine travel a specified stroke for welding;

wherein said travelling grinding machine and said travelling flash butt welder are moved together to meet the welded part of each of the billets, and said travelling flash butt welder is returned to a waiting position after said flash butt welding is completed; and wherein the burr on the welded part of each of the billets is removed while said travelling grinding machine independently changes travelling direction and travels a specified stroke, after the welded part arrives at a specified position.

2. A continuous rolling method comprising the steps of:

de-scaling billets sent directly from a continuous casting machine;

continuously welding the billets using a travelling flash butt welder;

grinding a burr on a welded part of the billets to remove the burr using a travelling grinding machine;

heating the billets to a target range of temperature using an induction heater; and conducting continuous rolling;

wherein said travelling flash butt welder and said travelling grinding machine are separately and integratedly movable along a running line of the billets based on a rolling capacity of an applied continuous rolling facility and a billet treatment cycle time defined by a billet weight; and wherein said travelling flash butt welder and said travelling grinding machine are moved separated from each other if the billet treatment cycle time does not exceed a standard cycle time, and said travelling flash butt welder and said travelling grinding machine are integratedly moved together if the billet treatment cycle time exceeds the standard cycle time.

* * * * *